(12) United States Patent
Zigadlo et al.

(10) Patent No.: US 6,292,212 B1
(45) Date of Patent: Sep. 18, 2001

(54) ELECTRONIC COLOR INFRARED CAMERA

(75) Inventors: Joseph P. Zigadlo; Carl L. Holden; Mark E. Schrader, all of Rochester; Richard M. Vogel, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/362,725

(22) Filed: Dec. 23, 1994

(51) Int. Cl.$^7$ .............................. H04N 9/64; H04N 9/07; H04N 3/14

(52) U.S. Cl. ..................... 348/33; 348/266; 348/273; 250/338.1

(58) Field of Search .................. 250/332, 330, 250/338.1; 348/277, 278, 164, 33, 266, 271, 29, 32, 272–73, 270–71

(56) References Cited

U.S. PATENT DOCUMENTS

| | | | |
|---|---|---|---|
| 3,566,015 | * 2/1971 | Watanabe | 178/5.4 |
| 3,748,471 | * 7/1973 | Ross et al. | 350/333 |
| 3,806,633 | * 4/1974 | Coleman | 348/33 |
| 3,935,589 | * 1/1976 | Ohta | 348/101 |
| 3,971,065 | * 7/1976 | Bayer | 348/266 |
| 4,016,597 | * 4/1977 | Dillon et al. | 346/266 |
| 4,170,987 | 10/1979 | Anselmo et al. | 128/665 |
| 4,403,247 | * 9/1983 | Sone et al. | 348/266 |
| 4,477,832 | * 10/1984 | Takemura | 348/266 |
| 4,652,911 | * 3/1987 | Teranishi et al. | 348/266 |
| 4,670,777 | * 6/1987 | Ishikawa et al. | 348/266 |
| 4,677,489 | * 6/1987 | Nishimura et al. | 358/213.13 |
| 4,679,068 | 7/1987 | Lillquist et al. | 358/44 |
| 4,688,085 | * 8/1987 | Imaide | 348/266 |
| 4,717,952 | * 1/1988 | Kohayakawa et al. | 348/266 |
| 4,751,571 | * 6/1988 | Lillquist | 348/33 |
| 4,786,964 | * 11/1988 | Plummer et al. | 348/266 |
| 4,922,334 | * 5/1990 | Hashimoto et al. | 348/266 |
| 4,943,517 | * 7/1990 | Powers et al | 430/301 |
| 4,952,809 | 8/1990 | McEwen | 250/342 |
| 4,998,164 | * 3/1991 | Endo et al. | 348/266 |
| 5,049,983 | * 9/1991 | Matsumoto et al. | 348/266 |
| 5,140,396 | * 8/1992 | Needham et al. | 357/30 |
| 5,282,043 | * 1/1994 | Cochard et al. | 358/213.28 |
| 5,373,322 | 12/1994 | Laroche et al. | 348/273 |
| 5,401,954 | * 3/1995 | Richert | 250/226 |
| 5,406,391 | * 4/1995 | Takahashi | 358/482 |
| 5,434,709 | * 7/1995 | Yamada et al. | 359/569 |
| 5,471,343 | * 11/1995 | Takasugi | 359/494 |
| 5,517,575 | * 5/1996 | Ladewski | 382/108 |
| 5,557,326 | * 9/1996 | Rantasuo et al. | 348/272 |

OTHER PUBLICATIONS

Christopher M.U. Neale "An Airborne Multispectral Video/Radiometer Remote Sensing System for Natural Resource Monitoring", Thirteenth Biennial Workshop on Color Aerial Photography, Orlando, Florida, May 6–9, 1992.

* cited by examiner

Primary Examiner—Vu Le
(74) Attorney, Agent, or Firm—Thomas H. Close

(57) ABSTRACT

An infrared digital electronic camera includes a solid state color image sensor having an array of image sensing elements and an array of color filter elements including infrared color filter elements arranged over the image sensing elements for producing a color image signal. A signal processing circuit processes the color image signals from the image sensor to produce a false color image signal.

13 Claims, 4 Drawing Sheets

ELECTRONIC COLOR INFRARED CAMERA

FIELD OF THE INVENTION

The invention relates generally to the field of photography, and in particular to multi-spectral photography. More specifically, the invention relates to an electronic color infrared camera.

BACKGROUND OF THE INVENTION

Infrared photography with false color materials offers potential value in a wide range of fields. Applications include medical, reconnaissance, geographical surveys, resource management (roads, buildings, and utilities), law enforcement, environmental and agricultural assessment, art authenticity analysis, forgery investigation, and pictorial applications.

Traditionally, false color images are captured photographically with traditional photographic cameras and infrared-sensitive film. The film products available on the market today are: KODAK Aerochrome Infrared Film 2443; and KODAK Aerochrome Infrared NP Film SO-134. These products are sensitive to light in the green (500–600 nm), red (600–700 nm), and infrared (700–900 nm) portions of the electromagnetic spectrum.

It has been proposed to employ 3 monochromatic video cameras, each having a spectral filter (e.g. green red and infrared centered on 550 nm, 650 nm and 850 nm respectively) and aimed at the same scene to produce a false color digital image signal. See the article "An airborne multi-spectral video/radiometer remote sensing system for natural resource monitoring" by C.M.U. Neale, Thirteenth Biennial Workshop on Color Aerial Photography, Orlando Fla., May 6–9, 1992.

More recently, infrared information has been captured with a panchromatic-infrared electronic camera. In this method, a filter wheel is placed before a panchromatic and infrared sensitive charge coupled device (CCD) array in an electronic camera. An image is acquired by sequentially exposing the CCD through a series of filters, which represent the desired spectral bands of the imagery. When imagery is acquired electronically, it can be easily downloaded from the camera into a computer, where it can be analyzed and displayed. Currently, Eastman Kodak's Professional Digital Camera System (DCS) Model 420 IR operates by this sequential filter wheel technique.

Although these technological options exist to capture infrared-sensitive imagery, they are not without problems. Today's infrared-sensitive films are consumable media and require wet photographic processing. Detailed analysis of the resulting images requires photographic scanning for input into geographic analysis computer software or digital image processing routines, causing a considerable delay in preparing and analyzing time-sensitive data. The infrared imaging systems employing video (as opposed to digital) imaging technology suffer from the problems of low resolution, poor response to relative image/camera motion, and the complexity resulting from the use of a number of cameras.

The state-of-the-art digital electronic technology described above requires a dedicated infrared electronic camera, with a moving filter-wheel assembly, as embodied in the DCS Model 420 IR camera system, with the Kodak Color Filter Wheel Assembly. Because the filter wheel requires sequential capture of the imagery bands (it acquires three bands in 40 seconds), the camera can only be used for still photography applications (i.e. where there is no relative movement between the camera and the scene), and is therefore not useful for aerial photography. Also, the filter wheel increases the complexity of the camera system thereby decreasing the mechanical reliability of the system.

Alternatively, an infrared sensitive electronic camera employing beam splitters and three linear detectors is shown in U.S. Pat. No. 4,170,987, issued Oct. 16, 1979 to Anselmo et al. This approach trades off the high cost and mechanical complexity of the filter wheel for the higher cost of three separate image detectors.

From the foregoing it is seen that there is a need for an improved digital electronic infrared camera to capture near infrared imagery.

SUMMARY OF THE INVENTION

The present invention is directed to overcoming one or more of the problems set forth above. According to one aspect of the invention, an infrared digital electronic camera includes a solid state color image sensor having an array of image sensing elements and an array of color filter elements including infrared color filter elements arranged over the image sensing elements for producing a color image signal. A signal processing circuit processes the color image signals from the image sensor to produce a false color image signal.

According to a further aspect of the invention, a digital electronic camera includes a solid state color image sensor having an array of image sensing elements and an array of red, green and blue color filter elements for producing a color image signal. A package for mounting the solid state color image sensor has a window that blocks blue light and passes infrared light. A signal processing circuit (preferably a programmed microprocessor, or alternatively a custom integrated circuit) processes the color image signals from the image sensor to produce a false color image signal by subtracting an infrared signal from the red and green signals produced by the image sensor. This aspect of the invention has the special advantage of being easily and cost effectively produced in a process that normally produces true color digital image cameras, by merely replacing the window in the package for mounting the image sensor and adding appropriate signal processing, thereby realizing economies of scale in the manufacturing process.

According to a still further aspect of the invention, a digital electronic camera is provided, having: a solid state color image sensor with an array of image sensing elements and an array of color filter elements arranged over the image sensing elements for producing a color image signal. A filter mechanism having an infrared filter portion and a color filter portion is moveable between a first position wherein the infrared filter portion is located to filter light reaching the image sensor, and a second position wherein the color filter portion is located to filter light reaching said image sensor. A signal processing circuit responds to the filter being in the second position for processing the color image signals from the image sensor to produce a false color image signal. This aspect of the invention has the special advantage of being readily convertible between an infrared sensing electronic camera to a true color electronic camera. In a preferred embodiment of this aspect of the invention, the image sensor has red, green and blue sensitive elements, the color filter portion of the filter mechanism is a yellow filter, and the signal processing circuit removes an infrared component from the green and red signal when the yellow filter is over the image sensor. The signal processing circuit causes the green component of the sensed image to be displayed as blue, the red component to be displayed as green, and the infrared to be displayed as red.

The infrared electronic camera of the present invention is advantageous in that all three color bands of information are collected concurrently without the need for a mechanical filter wheel assembly; nor does the camera need multiple cameras, multiple image sensors, or means for image registration between the images from multiple cameras or multiple image sensors. The infrared camera of the present invention is useful for motion or rapid capture applications.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
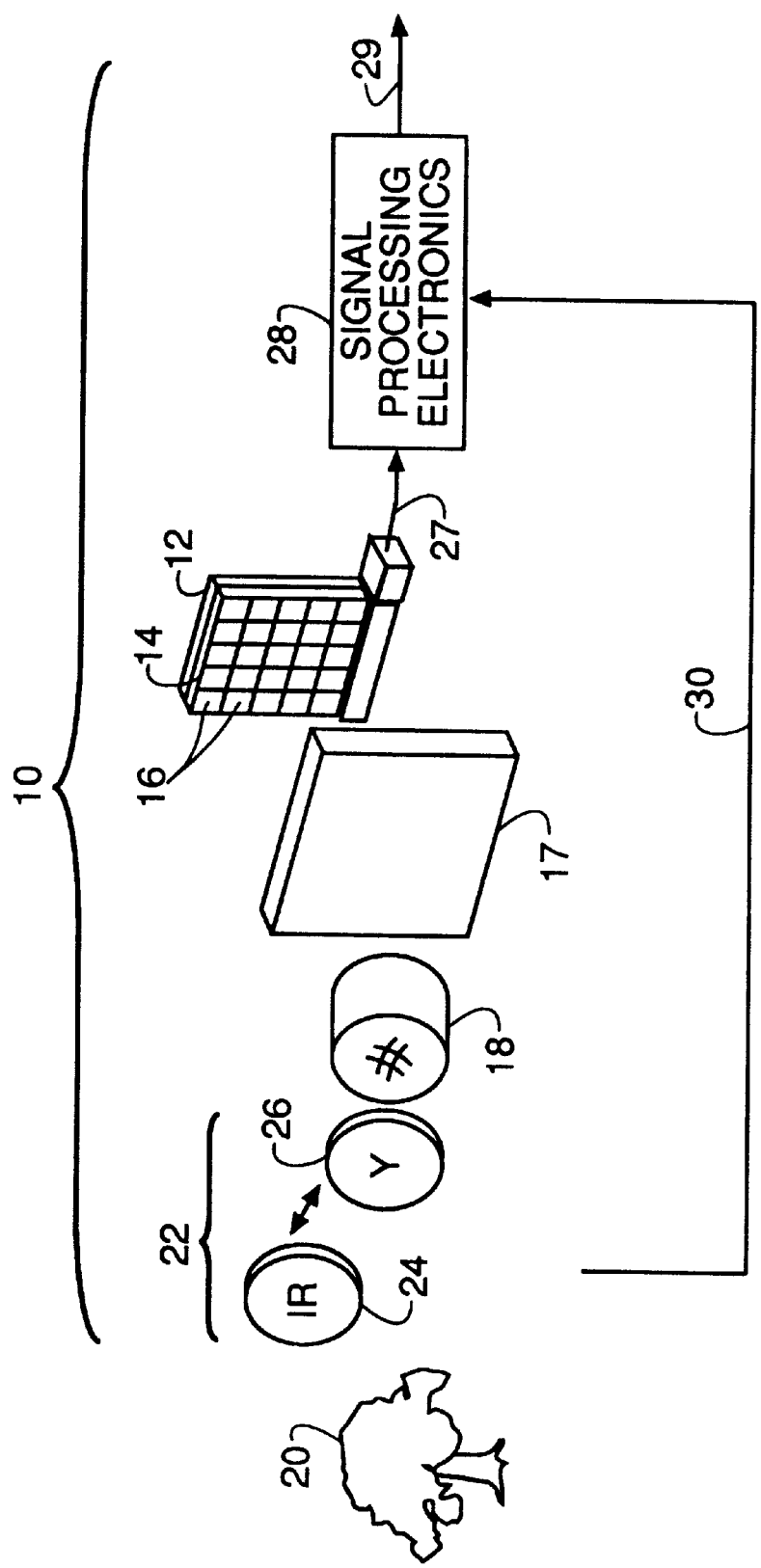
FIG. 1 is a schematic diagram of an infrared camera according to the present invention.

Referring now to FIG. 1, an infrared camera according to the present invention is shown. The camera, generally designated 10, includes a two dimensional solid state image sensing array 12. The image sensor 12 may comprise any of the known configurations for solid state image sensors, such as frame transfer, interline transfer CCD's, or diode arrays. The image sensor 12 includes a color filter array 14 having an array of color filter elements 16 disposed over the image sensing elements of the image sensor 12. Conventional color image sensors are packaged in a container (not shown) having a window with an infrared filter to prevent exposure of the image sensor to infrared light. In the present invention, the image sensor 12 is packaged in a container with a clear glass window 17 that does not block the infrared wavelengths of interest.

A lens 18 is positioned with respect to the image sensor 12 to form an image of a scene 20 onto the image sensor. A filter mechanism 22 includes an infrared filter portion 24 and a yellow filter portion 26. The filter mechanism may simply comprise two different filter elements that are individually attachable to the front of the lens 18, or may comprise a more sophisticated mechanical mechanism for moving the filter portions with respect to lens 18. Although the filter mechanism 22 is shown located in front of lens 18 it is to be understood that it could be located anywhere in the optical path of sensor 12. When the yellow filter 26 is positioned in front of the lens 18, the camera 10 functions as an infrared camera according to the present invention. When the infrared filter 24 is positioned in front of lens 18 and the yellow filter 26 is removed, the camera 10 functions as a normal electronic true color camera. Preferably, for imaging vegetation, the yellow filter includes a low pass infrared cutoff filter that cuts off the infrared at 760 nm. For other applications, it is preferable to include an infrared cutoff filter that cuts off at 900 nm.

The output 27 of the sensor 12 is supplied to signal processing electronics 28. When the yellow filter 26 is positioned in front of lens 18, the signal processing electronics 28 produce a false color signal 29 as described below. The signal processing electronics 28 receives a signal 30 indicating the electronic camera is operating in the infrared sensing mode. Signal processing electronics 28 may comprise electronic circuitry in the camera, or alternatively, may be implemented in a general purpose digital computer such as a personal computer to which the signals generated by the electronic camera are sent. The signal 30 may be supplied automatically to the signal processing electronics 28 by the filter mechanism 22 or may be supplied manually by the operator of the camera.

Figure 2:
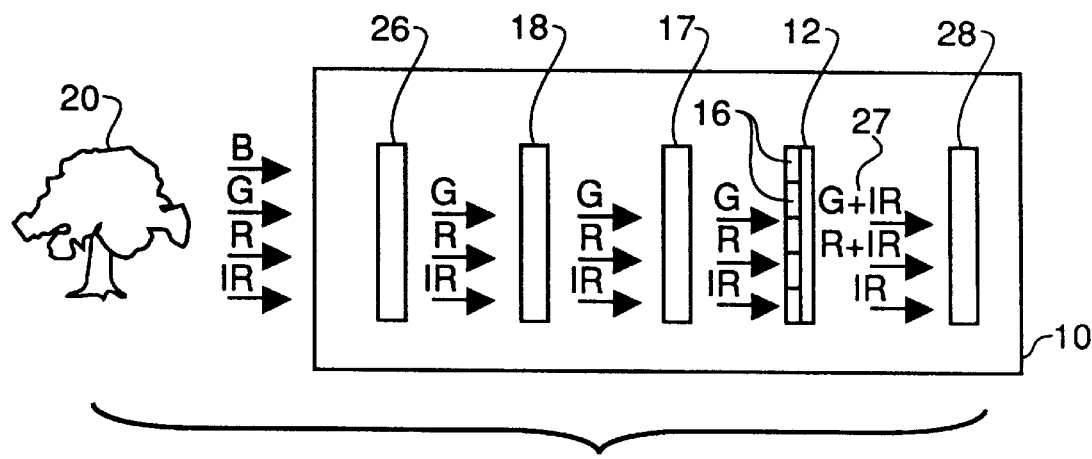
FIG. 2 is a schematic diagram showing how an infrared camera according to the present invention responds to a typical scene.

The operational concept of the camera when in the infrared sensing mode is shown in FIG. 2 where elements similar to those of FIG. 1 are similarly numbered. Spectral energy represented by the arrows labeled B,G,R, and IR is reflected or emitted from the object 20 (e.g. vegetation) in the blue (B), green (G), red (R), and infrared (IR) portions of the spectrum. The spectral information is first filtered through the yellow filter 26 in the camera 10, which eliminates any blue spectral information. So, only information in the green, red, and infrared portions of the spectrum remain. The remaining spectral information passes through the camera's lens 18 and the clear glass window 17 over the CCD sensor 12, thus preserving the green, red, and infrared information.

Now, the CCD sensor 12 captures the spectral information. The "green sensitive" pixels (those covered by green filter elements 16) on the CCD array now respond to both the green light and infrared light. Similarly, the "red sensitive" pixels (those covered by red filter elements 16) respond to the red and infrared light. The "blue sensitive" pixels (those covered by blue filter elements 16) on the CCD array now respond to only the infrared light. The image sensor 12 produces a digital image signal 27 that represent the sensed green red and infrared image information.

Figure 3:
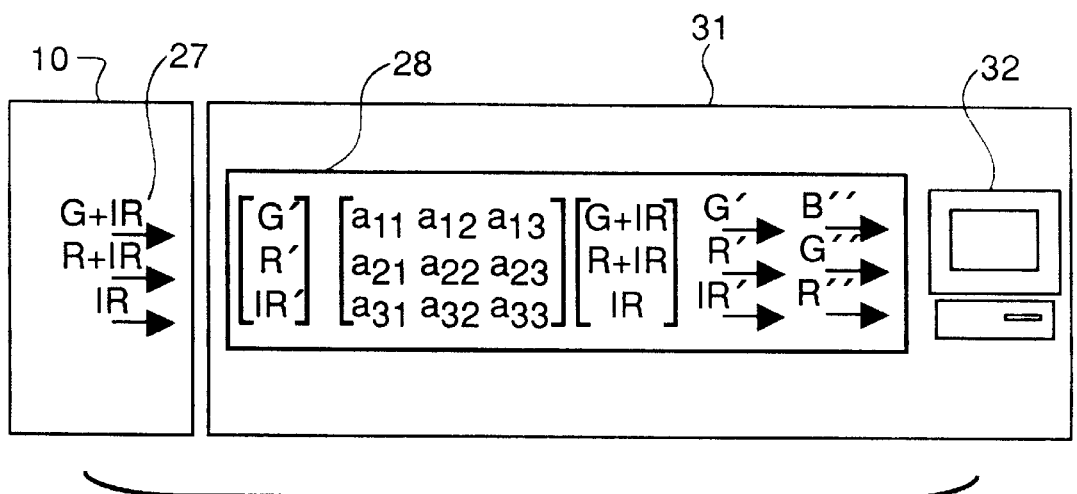
FIG. 3 is schematic diagram illustrating the signal processing and display of image data from a camera according to the present invention.

The output signal 27 is provided to signal processing electronics 28 (e.g. personal computer 31 having a CRT display 32) for additional processing to prepare the image for viewing, as shown in FIG. 3. Signal processing electronics 28 perform a data transformation which removes the infrared components from what were the green and red portions of the output signal 27. The infrared information may be removed from the green and red portions of the signal for example by calculating an infrared value for each pixel in the image and subtracting the infrared value from the red or green pixel values.

A preferred method of processing the image signals to compute an infrared value at each pixel location in the image is shown in U.S. Pat. No. 5,373,322, entitled "Apparatus and Method for Adaptively Interpolating a Full Color Image Utilizing Chrominance Gradients", issued Dec. 13, 1994, to C. A. Laroche and M. A. Prescott, which is incorporated herein by reference.

Additional color matrixing adjustments may be made by the signal processing electronics 28 to correct for color balance and unwanted overlap in the spectral bands that could not be filtered optically. The signal processing electronics also manipulates the image signal so the processed green information that represents the original scene (G') is displayed as blue (B"), the red information that represents the original scene (R') is displayed as green (G"), and the infrared information that represents the original scene (IR') is displayed as red (R") on CRT 32. Although this is a preferred method of false color display, any other choice of false color display could be used within the spirit of the present invention. Furthermore, if it is not desired to convert the camera from false color infrared to true color, the filter mechanism 22 may include only the yellow filter element 26, and the signal processing electronics 28 does not need to receive operating mode signal 30.

Figure 4:
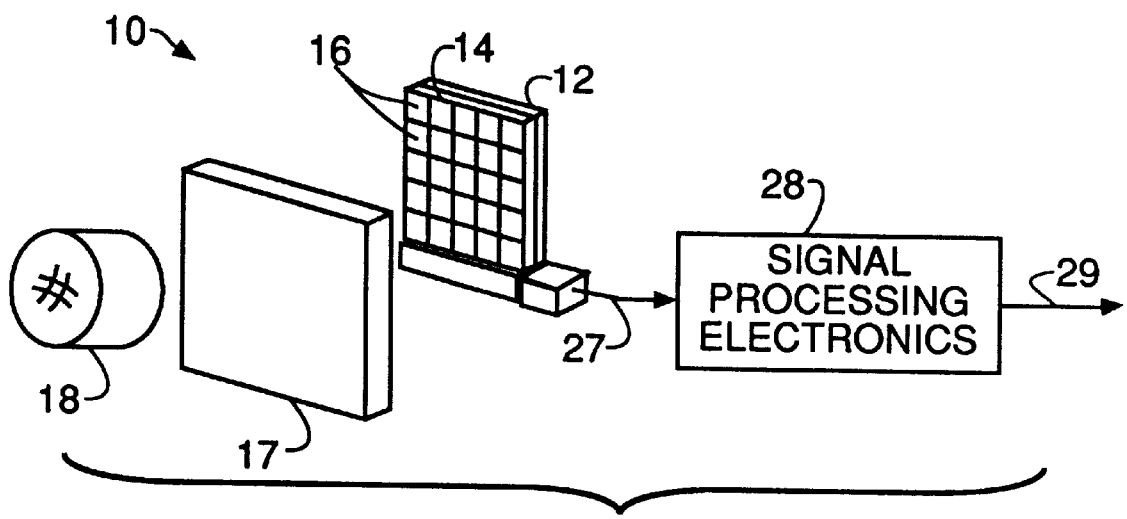
FIG. 4 is a schematic diagram showing an infrared camera according to an alternative embodiment of the present invention.
Figure 5:
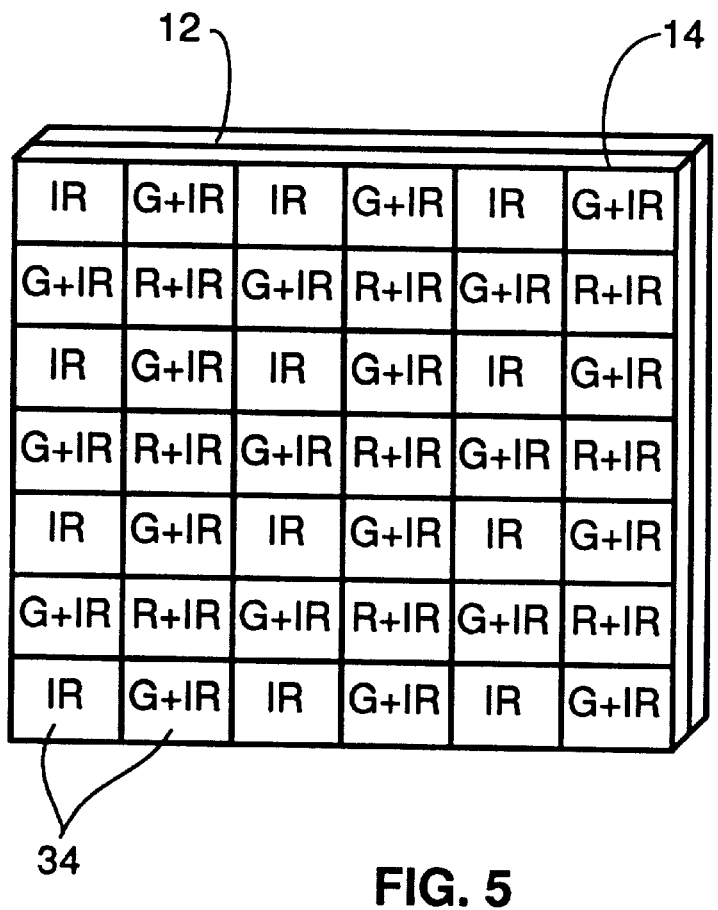
FIG. 5 is a schematic diagram showing an alternative color filter configuration used the camera shown in FIG. 4.
Figure 6:
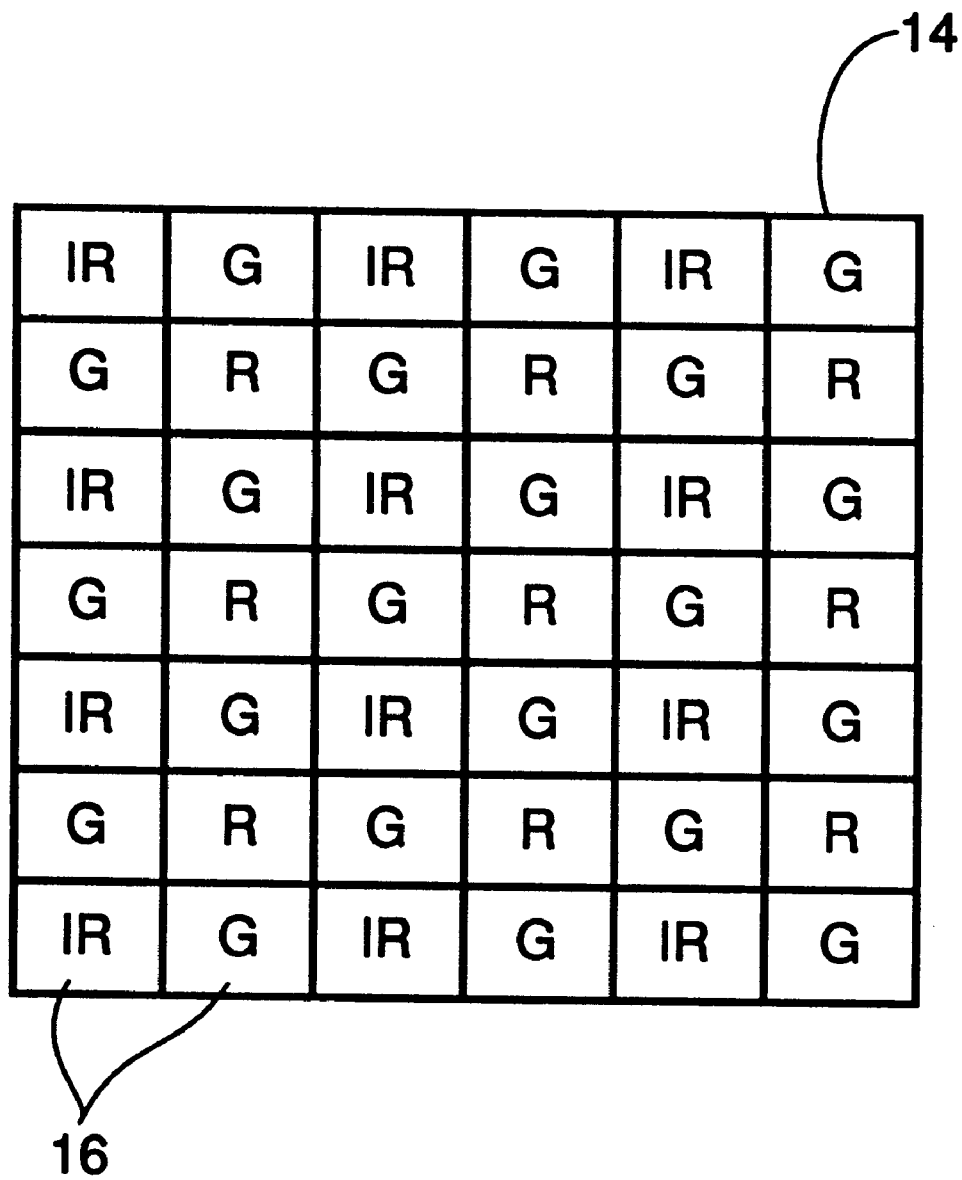
FIG. 6 is a schematic diagram showing a further alternative filter configuration.

Although the preferred embodiment of the invention employs user-selectable (yellow, infrared, or other) filters over the lens, other filter locations and configurations are possible. For example as shown in FIG. 4, the yellow filter could be included in the glass window 17 in the image sensor package. In this embodiment, the camera is not readily convertible to a true color camera. Alternatively, the yellow filter can be included in or formed directly over or under the filter array 14 of the image sensor 12. FIG. 5 shows the resulting color sensitivity of the pixels 34 in an image sensor 12 with such an arrangement, where R+IR indicates sensitivity to red and infrared, etc. Alternatively, the filter array 14 of the infrared camera of FIG. 4 may directly filter green (G) red (R) and infrared(IR), as illustrated in FIG. 6. In this embodiment, the yellow filter is not present in the system. The filter elements 16 in FIG. 6 may be formed from suitable organic dyes or multi-layer dielectric color filters as is known in the prior art. In this embodiment, the signal processing electronics is not required to subtract an infrared component from the green and red signals.

The invention has been described with reference to a preferred embodiment. However, it will be appreciated that variations and modifications can be effected by a person of ordinary skill in the art without departing from the scope of the invention.

PARTS LIST 10 camera
12 image sensor
14 color filter array
16 color filter element
17 glass window
18 lens
20 scene
22 filter mechanism
24 infrared filter portion
26 yellow filter portion
27 digital image signal
28 signal processing electronics
29 false color signal
30 operating mode signal
31 personal computer
32 CRT
34 pixels

What is claimed is:

1. An infrared digital electronic camera, comprising:
  a. a solid state color image sensor having an array of image sensing elements and an array of color filter elements arranged over said image sensing elements for producing a color image signal, said color filter elements including infrared color filter elements that block blue light and pass infrared light; and
  b. a signal processing circuit for processing said color image signals from said image sensor to produce a false color image signal.

2. The infrared digital electronic camera claimed in claim 1, wherein said array of color filter elements includes elements that pass red, green and infrared wavelengths of light.

3. An infrared digital electronic camera comprising:
  a. a solid state color image sensor having an array of image sensing elements, an array of red, green and blue color filter elements arranged over said image sensing elements for producing a color image signal, and a yellow filter element arranged to filter light impinging on said color image sensor; and
  b. a signal processing circuit for processing said color image signals from said image sensor to produce a false color image signal.

4. The infrared digital electronic camera claimed in claim 3, wherein said camera has a lens and said yellow filter element is positioned in front of said lens.

5. The infrared digital electronic camera claimed in claim 3, wherein said yellow filter is positioned on the surface of said image sensor.

6. The infrared digital electronic camera claimed in claim 3, wherein said image sensor is packaged in a container having a window and wherein said yellow filter is located at said window.

7. The electronic camera claimed in claim 3, wherein said yellow filter portion includes an infrared cutoff filter that cuts off at 760 nm.

8. The electronic camera claimed in claim 3, wherein said yellow filter portion includes an infrared cutoff filter that cuts off at 900 nm.

9. A convertible infrared digital electronic camera, comprising:
  a. a solid state color image sensor having an array of image sensing elements and an array of color filter elements arranged over said image sensing elements for producing a color image signal;
  b. a filter mechanism having an infrared filter portion and a color filter portion, moveable between a first position wherein said infrared filter portion is located to filter light reaching said image sensor, and a second position wherein said color filter portion is located to filter light reaching said image sensor; and
  c. a signal processing circuit responsive to said filter mechanism being in said second position for processing said color image signals from said image sensor to produce a false color image signal.

10. The electronic camera claimed in claim 9, wherein said array of color filter elements includes red green and blue color filter elements whereby said image sensor normally produces an image signal having red, green and blue components, said color filter portion is a yellow filter whereby said blue component is an infrared component when said filter is in said second position, and said signal processing circuit removes an infrared component from said red and green signal components.

11. The electronic camera claimed in claim 10, wherein said signal processing circuit further replaces the displayed blue signal component with the green component, replaces the displayed green component with the red component, and replaces the displayed red component with the infrared component.

12. The electronic camera claimed in claim 9, wherein said yellow filter portion includes an infrared cutoff filter that cuts off at 760 nm.

13. The electronic camera claimed in claim 9, wherein said yellow filter portion includes an infrared cutoff filter that cuts off at 900 nm.

* * * * *